United States Patent [19]

Rodriguez

[11] 4,147,329
[45] Apr. 3, 1979

[54] WEED PLUCKER

[76] Inventor: Victor N. Rodriguez, 5712 E. 12th St., Tucson, Ariz. 85711

[21] Appl. No.: 899,568

[22] Filed: Apr. 24, 1978

[51] Int. Cl.² ............................................. B66F 3/00
[52] U.S. Cl. .................................... 254/132; 294/50.9
[58] Field of Search .............. 254/132; 294/50.8, 50.9; 30/249

[56] References Cited

U.S. PATENT DOCUMENTS

| 1,502,246 | 7/1924 | Hagopian | 254/132 |
| 3,594,903 | 7/1971 | Schluchter | 30/249 |

Primary Examiner—Robert C. Watson
Attorney, Agent, or Firm—J. Michael McClanahan

[57] ABSTRACT

A device for selectively engaging weed plants at their ground or below ground level, securing the stem or root thereof and levering the plant, roots and all, from the ground. Jaws of the device engage the plant stem in a narrowing wedge configuration without severing the plant stem and, as the plant retracting lever action is applied, the jaws are cammed closer together further securing the plant stem therebetween and permitting the operator to withdraw the plant from the ground.

5 Claims, 3 Drawing Figures

WEED PLUCKER

BACKGROUND OF THE INVENTION

Throughout history, many devices have been constructed and patented for either cutting or pulling out weed plants at or below the ground level. Since in many weeds, the root system can be so extensive that it requires a great deal of energy and strength to pull the weed and its roots from the ground, many of the devices for pulling weeds out have employed lever action type means in order that the strength of the operator may thereby be multiplied. While this feature appears to be common to many weed pulling devices, the prior art devices differ in the means and manner by which they secure the plant or weed in order that it might be withdrawn from the ground. For example, plant removal apparatus have been suggested such as devices coming down over the plant and holding the stem in a clam shell type arrangement for pulling from the ground, or to clamp two jaws about the plant and then withdraw same. Still other types of devices have been constructed having a pair of half rounded tubular protrusions forced into the soil around the plant stem, one protrusion forcibly urged against the other by a handle connecting it above the ground and then once a grip is secured about the plant, the whole plant, together with the surrounding soil, is lifted straight from the ground without the benefit of strength multiplication through lever means.

SUMMARY OF THE INVENTION

The present invention comprises a device by which weed plants may be withdrawn, roots and all, from the ground by means of positive locking jaws grasping the weed plant where as the plant is being initially withdrawn from the ground, the surrounding and closing jaws of the invention forces the plant against a fixed holding surface of one jaw further securing the plant for levering out of the ground. More specifically, the plant stem or root is surrounded by two closing blades which, in closing, urge and force the plant to a position of a continually shrinking wedge or triangle configuration where once the operator determines the plant is secured, the plant is levered out of the ground by an attached handle. Upon the pulling backward and downward of the handle, one of the closing blades is further camed into the other such to additionally secure the plant stem or root to assure that the plant is securely held and, in fact, may be pulled completely from the ground.

Accordingly, it is an object of the present invention to provide a device to pull plants, roots and all, from the ground.

Another object of the invention is to provide a means of securing jaws about the plant stem or root to pull the plant from the ground.

A still further object of the present invention is to provide a means to grasp the plant in a shrinking triangle or wedge type configuration to secure the plant root for pulling from the ground.

A still further object of the present invention is to provide a means whereby a plant is secured about its stem or roots and pulled from the ground by lever means.

And a still further object of the present invention is to provide a device whereby as a plant is levered from the ground, the means holding the plant are further forcibly secured about the plant stem.

DETAILED DESCRIPTION OF PREFERRED EMBODIMENT

Figure 1:
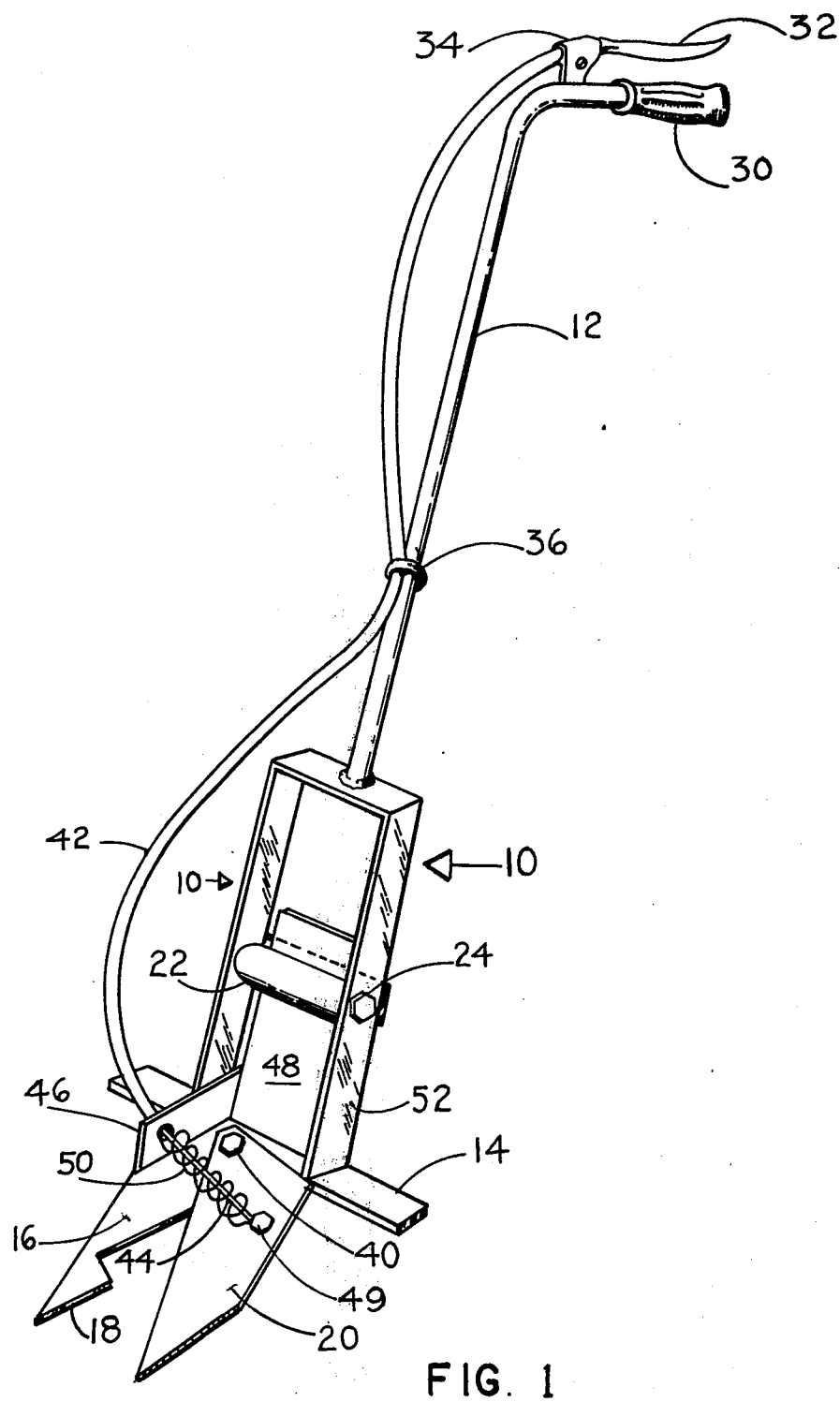
FIG. 1 is a perspective view of the invention.

Referring now to FIG. 1, a perspective view of the subject invention is detailed. More specifically, the subject inventive weed plucker comprises the basic metal rectangular shaped welded or formed frame 10 having attached by welding or other suitable means at its upper distal point, handle 12, and at the lowest distal point, base plate 14. In pivotal relationship interiorly to rectangular frame 10 is hinged assembly 16 which comprises, in part, hook plate 18 and pivot plate 20 which form the jaws of the invention. Additionally attached to the upper portion of hinged assembly 16 is hinge barrel 22 secured within the elongated sides of frame 10 by a central hinge pin 24.

As stated above, pipe like handle 12 is attached at one end to frame 10 by suitable means and has at its other end bicycle type handle grip 30. The handle 12 rises approximately two feet above the top of frame 10 at which point it makes a 90° bend and is then covered with handle grip 30. Handle grip 30 is at an easily accessable height above the ground and orientation such that it may be easily and comfortably grasped by the operating party. It has been found convenient for use to off-set handle 12 about 10° rearward from frame 10, i.e., a central line drawn through the vertical portion of handle 12 should make an angle of about 10° with the central line drawn through the elongated portion of frame 10. This provides added comfort and workability for the operator.

Hinged assembly 16, which resides at ground level, comprises in part hooked plate 18 and pivot plate 20, pivot plate 20 pivoting about pivot bolt 40 which penetrates both pivot plate 20 and hook plate 18. Attached to pivot plate 20 is cable assembly 42 cable 44, which cable's other end attaches to handle level 32 proximate handle grip 30 at the top of handle 12. Cable assembly 42, which houses cable 44, is attached to hinged assembly 16 vertical plate 46 and handle assembly 34. Cable assembly 42 is secured proximate handle 12 by means of tie 36. Interposed vertical plate 46 and the bolt and nut assembly 49 attaching cable 44 to pivot plate 20 is compression spring 50, which compression spring 50 tends to separate hook plate 18 and pivot plate 20 to their open most position. To close, cable 44 is pulled through cable assembly 42 by means of its attachment to handle lever 32.

Figure 2:
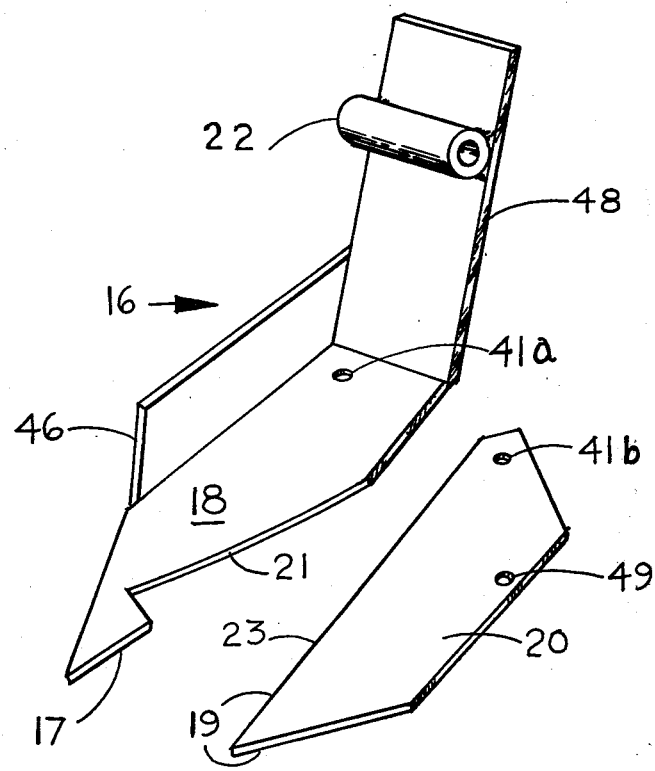
FIG. 2 is a perspective view of the hinged assembly portion of the invention.

Reference now to FIG. 2 shows in more detail hinged assembly 16 comprising two basic pieces, one pivot plate 20 and the other formed or welded plate made up of components hook plate 18, vertical plate 46, back plate 48, and hinge barrel 22. Shown also in hook plate 18 is hole 41a and in pivot plate 20 is hole 41b which are adapted to receive, when properly aligned, pivot bolt 40 (FIG. 1). Also shown in pivot plate 20 is hole 49, adapted to receive nut and bolt assembly 48 which secures cable 44 (FIG. 1). In the preferred embodiment, hook plate 18, vertical plate 36, and back plate 48 are held together by welding along all common seams, and all angles are 90°, i.e., vertical plate 46 is at a 90° angle with hook plate 18 as well as back plate 48 being at 90° angles both with hook plate 18 and vertical plate 46. In the upper portion of back plate 48, hinge barrel 22, a ¼ inch internal diameter steel pipe, is welded to back plate 48. This, as shown in FIG. 1, receives hinge pin 24 which penetrates both sides of frame 10 and the central hole of hinge barrel 22 to permit the limited pivoting of the whole hinged assembly 16 interiorly to frame 10. In the preferred embodiment, edge 17 of hook plate 18 and edges 19 of pivot plate 20 have flat edges 90° to the plate surface. Additionally, edges 21 of hook plate 18 and 23 of pivot plate 20 also are flat edges having 90° surfaces with relation to the flat portions of their respective plates. The reason for this is that it is not desired that the two plates, 18 and 20, sever the plant stem or root when the plates come together, but in fact secure the plant stem or root between the two plates in a narrowing wedge relationship and thereby permit the plant to be pulled out of the ground, roots and all.

Of course, an alternate embodiment of the invention is to put a chamfer or cutting edge along edges 17, 19, 21 and 23 and thereby sever the plant stem or root as the pivot plate 20 is drawn onto the hook blade 18 or when the stem root is contacted by the edge. However, this would not permit withdrawal of the weed plant, but merely cutting it off at the ground level.

Figure 3:
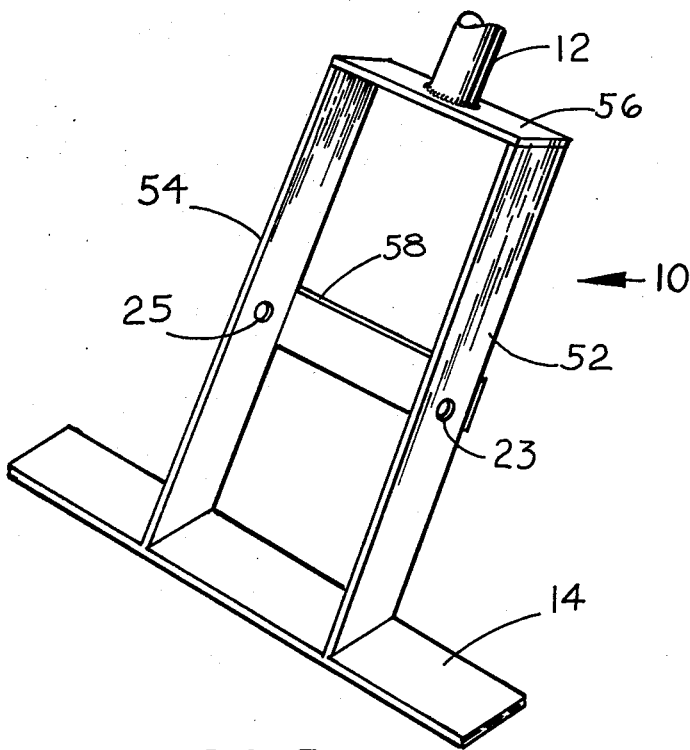
FIG. 3 is a perspective view of the frame portion of the invention.

Referring now to FIG. 3, a perspective view of frame 10 is detailed comprising elongated side plates 52 and 54, top plate 56, base plate 14 and central plate 58. Slightly below central plate 58 in side plates 52 and 54, are holes 23 and 25 respectively which are adapted to receive hinge pin 24 (FIG. 1). In a preferred embodiment of frame 10, as in hinged assembly 16, all plates are strap metal iron and are fastened together by welding and all angles are 90°. Central plate 58, as shown in FIG. 3 is attached to the outside back edge of side plates 52 and 54.

Although in the preferred embodiment frame 10 and hinged assembly 16 are constructed from sheet iron and steel having thicknesses of approximately ⅛ inch and are welded into shape, it is suggested that in production quantities, the metal may be of any thickness substantially able to stand the forces applied by the operator when in use and that the pieces may be held together by other means than welding, or for that matter, may be single pieces appropriately formed by bending or other constructive means. Additionally, the handle and cable assembly utilized in the preferred embodiment are commercially available components available at, for example, bicycle shops.

Referring now to FIG. 1, operation of the inventive weed plucker is described as follows. First the weed which is desired to be removed from the ground is selected and then the operator, by holding onto handle 30, positions the invention about the plant stem at ground level. The operator then pushes the hook plate and pivot plate forward edges forward in order that the plant is directed interiorly to the hook formed by hook plate 18. If the plant stem is tender, it may be necessary to dig into the ground an inch or so in order to get a better grip on the plant. The wedge formed by hook plate 18 and pivot plate 20 begins to be closed by squeezing the handle lever 32 until solid resistance presented by the plant stem is felt. The plant will be forced back into the far interior corner of the hook formed in hook plate 18.

Now that the plant is held in the corner of the triangle formed by hook plate 18 and pivot plate 20, handle 12, while holding onto handle lever 32, is pulled backwards, being levered around the fulcrum point formed by the ground and base plate 14. Downward resistance is placed upon the hinged assembly 16 by the plants resistance to being pulled out of the ground. This tends to pivot hinged assembly 16 downward where the back edge of pivot plate 20 is engaged by the front vertical edge of frame 10 side plate 52. Because of the engagement of the back edge of pivot plate 20 and the front edge of side plate 52, pivot plate 20 is camed about pivot bolt 40 and thus not only holds the pivot plate 20 in its originally held position, but adds additional force to the clamping arrangement between hook plate 18 and pivot plate 20 to ensure and minimize the chance that the plant stem or root would slip by the holding edges of hook plate 18 and pivot plate 20.

Continued movement of handle 12 downward and backwards tends to increase the pressure around the plant root or stem until the plant is pulled out, roots and all, from the ground.

It is noted that the placement of hinged assembly 16 within the interior of frame 19 is such that the hinged assembly 16 does not engage base plate 14 but, rather, pivots about hinge pin 24. Only the back portion of pivot plate 20 engages frame 10 at side plate 52. Similarly, back plate 48 of hinged assembly 16 engages and is stopped by central plate 58 (FIG. 3) to prevent the hinged assembly 16 from rotating out of frame 10.

While a preferred embodiment of the invention, together with alternate embodiments, have been shown and described, it would be understood that there is no intent to limit the invention by such disclosure, but rather, it is intended to cover all modifications and alternate constructions falling within the spirit and the scope of the invention as defined in the appended claims.

I claim:

1. Apparatus to extract plants and weeds from the ground comprising plant stem engaging and holding means having a first and second blade means operably connected to open and close in scissors-like fashion, said first blade means defining hook-shaped plate means adapted to overlap said second blade means to define a triangle shaped opening between said blades, both said blade means adapted to surround and engage the plant stem to be extracted; fulcrum means operably attached to said plant stem engaging and holding means, said fulcrum means adapted to rest upon the ground; and lever means attached to said fulcrum means whereby when said blade means opens and closes in scissors-like fashion, a narrowing closed triangular shaped opening between the blades is created to hold the plant stem in order that the plant may be levered out of the ground by rotating the lever handle means about the fulcrum means.

2. The apparatus for extracting plants from the ground as defined in claim 1 wherein said plant stem engaging and holding means includes manually operated second blade opening and closing means whereby said plant stem engaging and holding means may be opened and closed at will.

3. The apparatus for extracting plants from the ground as defined in claim 2 wherein said fulcrum means defines frame means adapted to pivotally receive said plant stem engaging and holding means, said frame means also defining cam means adapted to engage said second blade means whereby when both said blade means surround and close upon a plant stem to be extracted from the ground and the lever handle is rotated about the fulcrum means, the frame means cam means engaging said second blade means forcibly closes said second blade means about the plant stem.

4. The apparatus for extracting plants from the ground as defined in claim 3 wherein said plant stem engaging and holding means defines hinge means and said fulcrum means defines hinge pin means attached to said frame means whereby said plant stem engaging and holding means hinge means pivots about said fulcrum means hinge pin means.

5. The apparatus for extracting plants from the ground as defined in claim 4, wherein said lever handle means comprises elongated means extending from said fulcrum means frame means, said handle lever means including grip means and second lever means operably attached to said second blade opening and closing means whereby said second blade may be opened and closed by said second lever means.

* * * * *